(12) United States Patent
Ebrahimi Afrouzi

(10) Patent No.: US 10,346,995 B1
(45) Date of Patent: *Jul. 9, 2019

(54) REMOTE DISTANCE ESTIMATION SYSTEM AND METHOD

(71) Applicant: AI Incorporated, Toronto (CA)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,410

(22) Filed: Apr. 16, 2018

Related U.S. Application Data

(63) Continuation-in-part of application No. 15/243,783, filed on Aug. 22, 2016, now Pat. No. 9,972,098.

(51) Int. Cl.
*G06T 7/55* (2017.01)
*G06T 7/521* (2017.01)
*G01C 3/08* (2006.01)

(52) U.S. Cl.
CPC ............... *G06T 7/521* (2017.01); *G01C 3/08* (2013.01); *G06T 7/55* (2017.01)

(58) Field of Classification Search
CPC ............. G06T 7/521; G06T 7/55; G01C 3/08
See application file for complete search history.

(56) References Cited

U.S. PATENT DOCUMENTS

| | | | |
|---|---|---|---|
| 5,054,912 A | 10/1991 | Kuchel | |
| 6,545,749 B1 | 4/2003 | Andersson | |
| 6,847,435 B2 | 1/2005 | Honda et al. | |
| 7,187,452 B2 | 3/2007 | Jupp et al. | |
| 7,796,782 B1 | 9/2010 | Motamedi | |
| 7,889,324 B2 | 2/2011 | Yamamoto | |
| 7,995,799 B2 | 8/2011 | Schultz et al. | |
| 8,558,993 B2 | 10/2013 | Newbury et al. | |
| 9,677,986 B1* | 6/2017 | Baldwin | G01N 15/06 |
| 9,800,795 B2* | 10/2017 | Zabatani | H04N 5/2351 |
| 2005/0280802 A1 | 12/2005 | Liu | |
| 2012/0185091 A1* | 7/2012 | Field | G05D 1/0044 700/254 |
| 2013/0107010 A1* | 5/2013 | Hoiem | G06K 9/46 348/47 |
| 2014/0192158 A1* | 7/2014 | Whyte | G06K 9/6201 348/46 |
| 2014/0225988 A1* | 8/2014 | Poropat | G01S 17/89 348/46 |

(Continued)

*Primary Examiner* — Lin Ye
*Assistant Examiner* — John H. Morehead, III

(57) ABSTRACT

A distance estimation system comprised of a laser light emitter, two image sensors, and an image processor are positioned on a baseplate such that the fields of view of the image sensors overlap and contain the projections of an emitted collimated laser beam within a predetermined range of distances. The image sensors simultaneously capture images of the laser beam projections. The images are superimposed and displacement of the laser beam projection from a first image taken by a first image sensor to a second image taken by a second image sensor is extracted by the image processor. The displacement is compared to a preconfigured table relating displacement distances with distances from the baseplate to projection surfaces to find an estimated distance of the baseplate from the projection surface at the time that the images were captured.

16 Claims, 7 Drawing Sheets

(56) References Cited

U.S. PATENT DOCUMENTS

| | | | |
|---|---|---|---|
| 2014/0268098 A1* | 9/2014 | Schwarz | G01C 3/08 356/4.07 |
| 2015/0036886 A1* | 2/2015 | Matono | G08G 1/166 382/106 |
| 2015/0146926 A1* | 5/2015 | Ramachandran | G06K 9/00624 382/103 |
| 2015/0198440 A1* | 7/2015 | Pearlman | G01S 17/023 356/4.01 |
| 2015/0304631 A1* | 10/2015 | Lee | H04N 5/265 348/46 |
| 2015/0338204 A1* | 11/2015 | Richert | G06T 7/593 348/135 |

* cited by examiner

REMOTE DISTANCE ESTIMATION SYSTEM AND METHOD

CROSS-REFERENCE TO RELATED APPLICATIONS

This is a continuation-in-part of U.S. patent application Ser. No. 15/243,783 filed Aug. 22, 2016 which is a Non-provisional Patent Application of U.S. Provisional Patent Application No. 62/208,791 filed Aug. 23, 2015 all of which are herein incorporated by reference. In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE INVENTION

This disclosure relates to remote distance estimation systems and methods.

BACKGROUND OF THE DISCLOSURE

Mobile robotic devices are being used more and more frequently in a variety of industries for executing different tasks with minimal or no human interaction. Such devices rely on various sensors to navigate through their environment and avoid driving into obstacles.

Infrared sensors, sonar and laser range finders are some of the sensors used in mobile robotic devices. Infrared sensors typically have a low resolution and are very sensitive to sunlight. Infrared sensors that use a binary output can determine whether an object is within a certain range but are unable to accurately determine the distance to the object. Sonar systems rely on ultrasonic waves instead of light. Under optimal conditions, some sonar systems can be very accurate; however, sonar systems typically have limited coverage areas: if used in an array, they can produce cross-talk and false readings; if installed too close to the ground, signals can bounce off the ground, degrading accuracy. Additionally, sound-absorbing materials in the area may produce erroneous readings.

Laser Distance Sensors (LDS) are a very accurate method for measuring distance that can be used with robotic devices. However, due to their complexity and cost, these sensors are typically not a suitable option for robotic devices intended for day-to-day home use. These systems generally use two types of measurement methods: Time-of-Flight (ToF) and Triangulation. In ToF methods, the distance of an object is usually calculated based on the round trip of the emission and reception of a signal. In Triangulation methods, usually there is a source and a sensor on the device with a fixed baseline. The emitting source emits the laser beam at a certain angle. When the sensor receives the beam, the sensor calculates the degree at which the beam entered the sensor. Using those variables, the distance traveled by the laser beam may be calculated with triangulation.

A need exists for a more accurate and reliable, yet affordable, method for automatic remote distance measuring.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Embodiments of the present invention introduce new methods and systems for distance estimation. Some embodiments present a distance estimation system including a laser light emitter disposed on a baseplate emitting a collimated laser beam which projects a light point onto surfaces opposite the emitter; two image sensors disposed symmetrically on the baseplate on either side of the laser light emitter at a slight inward angle towards the laser light emitter so that their fields of view overlap while capturing the projections made by the laser light emitter; an image processor to determine an estimated distance from the baseplate to the surface on which the laser light beam is projected using the images captured simultaneously and iteratively by the two image sensors. Each image taken by the two image sensors shows the field of view including the point illuminated by the collimated laser beam. At each discrete time interval, the image pairs are overlaid and the distance between the light points is analyzed by the image processor. This distance is then compared to a preconfigured table that relates distances between light points with distances from the baseplate to the projection surface to find the actual distance to the projection surface.

In embodiments, the assembly may be mounted on a rotatable base so that distances to surfaces may be analyzed in any direction. In some embodiments, the image sensors capture the images of the projected laser light emissions and processes the image. Using computer vision technology, the distances between light points is extracted and the distances may be analyzed.

In embodiments, methods for remotely estimating distance are disclosed including emitting a collimated laser beam from a laser light emitter disposed on a baseplate, the collimated laser projecting a light point on a surface opposite the laser light emitter; capturing images of the projected light point by each of at least two image sensors disposed on the baseplate and positioned at an inward angle with respect to the laser light emitter such that the light point is contained within a predetermined range of distances; overlaying the images captured by the at least two image sensors by using an image processor to produce a superimposed image showing both captured images in a single image; measuring a first distance between the captured images of the projected light point in the superimposed image; and, extracting a second distance from a preconfigured table that relates distances between light points with distances between the baseplate and the surfaces on which the collimated laser beam is projected to find an estimated distance between the baseplate and the surface on which the collimated laser beam is projected based on the first distance between the captured images.

In embodiments, method for remotely estimating distance include emitting a collimated laser beam from a laser light emitter disposed on a baseplate, the collimated laser projecting a light point on a surface opposite the laser light emitter; capturing images of the projected light point by each of at least two image sensors disposed on the baseplate such that the light point is contained within the images of the at least two image sensors for a predetermined range of distances; overlaying the images captured by the at least two image sensors to produce a superimposed image showing both captured images; measuring a first distance between the light point in the superimposed image; and extracting a second distance from a preconfigured table that relates the distance between light points with distance between the baseplate and the surfaces on which the collimated laser beam is projected.

In embodiments, method for remotely estimating distance include emitting a line laser from a laser light emitter disposed on a baseplate at an angle relative to a horizontal plane, the line laser projecting a line on a surface opposite the laser light emitter; capturing images of the projected line by at least one image sensor disposed on the baseplate; identifying the projected laser line by a processor; determining a position of the projected line within the image by the processor; and, extracting a distance from a preconfigured table that relates the position of the projected line within the image with distance between the baseplate and the surface on which the laser line is projected by the processor.

In embodiments, method for identifying a laser light in a captured image of the laser light projected onto a surface include identifying at least one potential laser light in the captured image; measuring the width of the at least one potential laser light; extracting the expected width of the laser light from a preconfigured table relating the width of the laser light to distance from the surface onto which the light is projected for a known distance from the surface onto which the light is projected; comparing the width of the at least one potential laser light with the expected width of the laser light; and identifying the laser light when the measured width of the potential laser light is similar to the expected width of the laser light.

In embodiments, method for identifying a laser light in a captured image of the laser light projected onto a surface include identifying at least one potential laser light in the captured image; detecting at least one discontinuity in the intensity values of the pixels forming the at least one potential laser light; and identifying the laser light when there are no discontinuities in the intensity values of the pixels forming the at least one potential laser light.

DETAILED DESCRIPTION

Figure 1A:
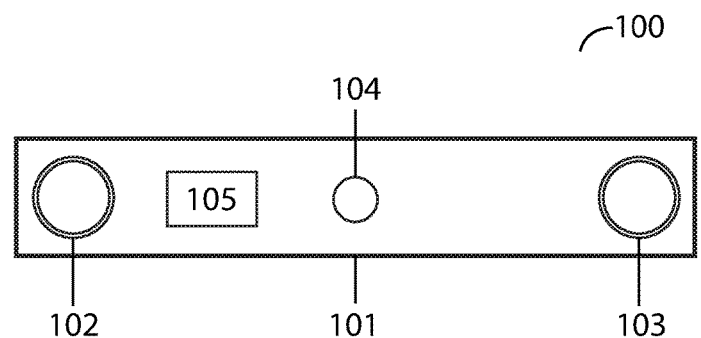
FIG. 1A illustrates a front elevation view of an embodiment of a distance estimation device, embodying features of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a computer and/or a dedicated computing device when appropriately programmed and may include a combination of a computer/computing device and dedicated/programmable circuits adapted for the various tasks pertaining to embodiments of the invention. The disclosure described herein is directed generally to one or more processor-automated methods and/or systems that estimate distance of a device with an object also known as di stance estimation systems.

Embodiments described herein include a distance estimation system including a laser light emitter disposed on a baseplate emitting a collimated laser beam creating an illuminated, such as a light point or projected light point, on surfaces that are substantially opposite the emitter; two image sensors disposed on the baseplate, positioned at a slight inward angle towards to the laser light emitter such that the fields of view of the two image sensors overlap and capture the projected light point within a predetermined range of distances, the image sensors simultaneously and iteratively capturing images; an image processor overlaying the images taken by the two image sensors to produce a superimposed image showing the light points from both images in a single image; extracting a distance between the light points in the superimposed image; and, comparing the distance to figures in a preconfigured table that relates distances between light points with distances between the baseplate and surfaces upon which the light point is projected (which may be referred to as 'projection surfaces' herein) to find an estimated distance between the baseplate and the projection surface at the time the images of the projected light point were captured.

In some embodiments, the preconfigured table may be constructed from actual measurements of distances between the light points in superimposed images at increments in a predetermined range of distances between the baseplate and the projection surface.

In embodiments, each image taken by the two image sensors shows the field of view including the light point created by the collimated laser beam. At each discrete time interval, the image pairs are overlaid creating a superimposed image showing the light point as it is viewed by each image sensor. Because the image sensors are at different locations, the light point will appear at a different spot within the image frame in the two images. Thus, when the images are overlaid, the resulting superimposed image will show two light points until such a time as the light points coincide. The distance between the light points is extracted by the image processor using computer vision technology, or any other type of technology known in the art. This distance is then compared to figures in a preconfigured table that relates distances between light points with distances between the baseplate and projection surfaces to find an estimated distance between the baseplate and the projection surface at the time that the images were captured. As the distance to the surface decreases the distance measured between the light point captured in each image when the images are superimposed decreases as well.

In some embodiments, the emitted laser point captured in an image is detected by the image processor by identifying pixels with high brightness, as the area on which the laser light is emitted has increased brightness. After superimposing both images, the distance between the pixels with high brightness, corresponding to the emitted laser point captured in each image, is determined.

The image sensors may be positioned at an angle such that the light point captured in each image coincides at or before the maximum effective distance of the distance sensor, which is determined by the strength and type of the laser emitter and the specifications of the image sensor used.

In some instances, a line laser is used in place of a point laser. In such instances, the images taken by each image sensor are superimposed and the distance between coinciding points along the length of the projected line in each image may be used to determine the distance from the surface using a preconfigured table relating the distance between points in the superimposed image to distance from the surface.

Figure 1B:
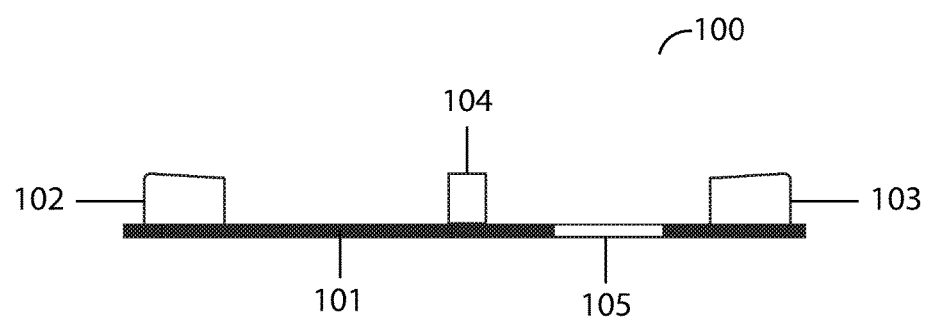
FIG. 1B illustrates an overhead view of an embodiment of a distance estimation device, embodying features of the present invention.

Referring to FIG. 1A, a front elevation view of an embodiment of distance estimation system 100 is illustrated. Distance estimation system 100 is comprised of baseplate 101, left image sensor 102, right image sensor 103, laser light emitter 104, and image processor 105. The image sensors are positioned with a slight inward angle with respect to the laser light emitter. This angle causes the fields of view of the image sensors to overlap. The positioning of the image sensors is also such that the fields of view of both image sensors will capture laser projections of the laser light emitter within a predetermined range of distances. Referring to FIG. 1B, an overhead view of remote estimation device 100 is illustrated. Remote estimation device 100 is comprised of baseplate 101, image sensors 102 and 103, laser light emitter 104, and image processor 105.

Figure 2:
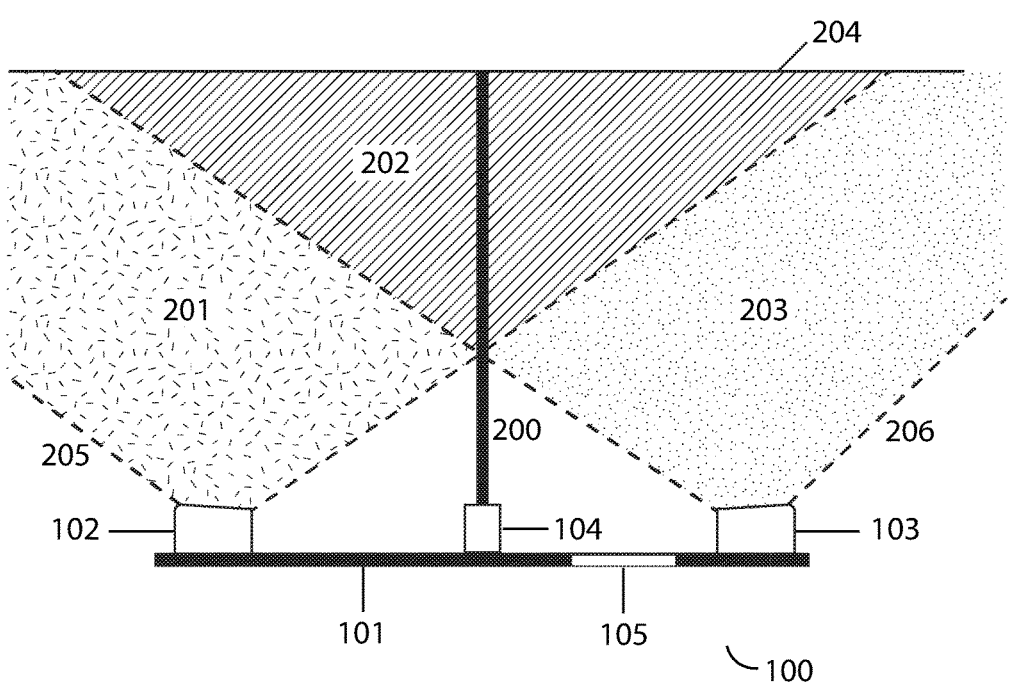
FIG. 2 illustrates an overhead view of an embodiment of a distance estimation device and fields of view of its image sensors, embodying features of the present invention.

Referring to FIG. 2, an overhead view of an embodiment of the remote estimation device and fields of view of the image sensors is illustrated. Laser light emitter 104 is disposed on baseplate 101 and emits collimated laser light beam 200. Image processor 105 is located within baseplate 101. Area 201 and 202 together represent the field of view of image sensor 102. Dashed line 205 represents the outer limit of the field of view of image sensor 102. (It should be noted that this outer limit would continue on linearly, but has been cropped to fit on the drawing page.) Area 203 and 202 together represent the field of view of image sensor 103. Dashed line 206 represents the outer limit of the field of view of image sensor 103. (It should be noted that this outer limit would continue on linearly, but has been cropped to fit on the drawing page.) Area 202 is the area where the fields of view of both image sensors overlap. Line 204 represents the projection surface. That is, the surface onto which the laser light beam is projected.

Figure 3A:
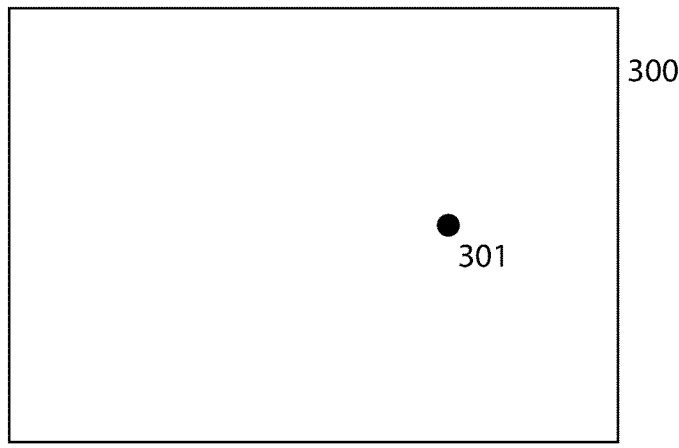
FIGS. 3A-3C illustrate an embodiment of distance estimation using a variation of a distance estimation device, embodying features of the present invention.
Figure 3B:
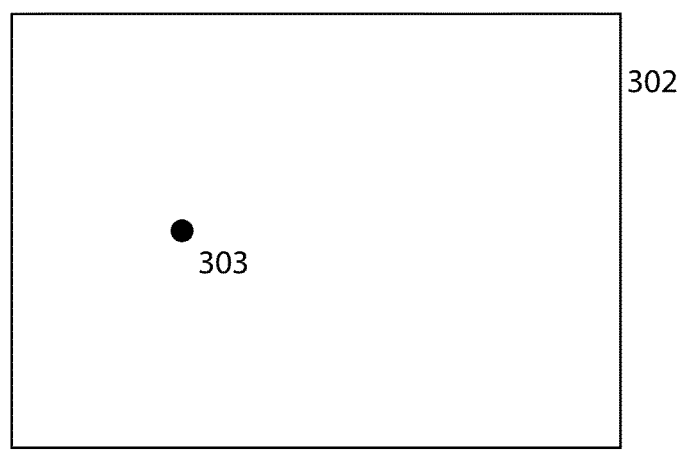

The image sensors simultaneously and iteratively capture images at discrete time intervals. Referring to FIG. 3A, an embodiment of the image captured by left image sensor 102 (in FIG. 2) is illustrated. Rectangle 300 represents the field of view of image sensor 102. Point 301 represents the light point projected by laser beam emitter 104 as viewed by image sensor 102. Referring to FIG. 3B, an embodiment of the image captured by right image sensor 103 (in FIG. 2) is illustrated. Rectangle 302 represents the field of view of image sensor 103. Point 303 represents the light point projected by laser beam emitter 104 as viewed by image sensor 102. As the distance of the baseplate to projection surfaces increases, light points 301 and 303 in each field of view will appear further and further toward the outer limits of each field of view, shown respectively in FIG. 2 as dashed lines 205 and 206. Thus, when two images captured at the same time are overlaid, the distance between the two points will increase as distance to the projection surface increases.

Figure 3C:
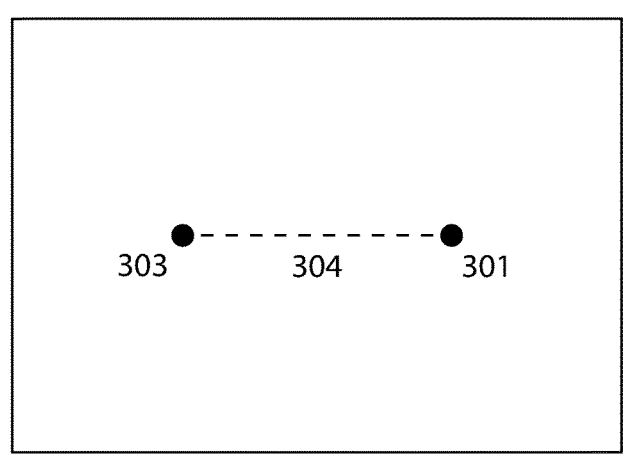

Referring to FIG. 3C, the two images from FIG. 3A and FIG. 3B are shown overlaid. Point 301 is located a distance 304 from point 303. The image processor 105 (in FIG. 1A) extracts this distance. The distance 304 is then compared to figures in a preconfigured table that co-relates distances between light points in the superimposed image with distances between the baseplate and projection surfaces to find an estimate of the actual distance from the baseplate to the projection surface upon which the images of the laser light projection were captured.

Figure 4A:
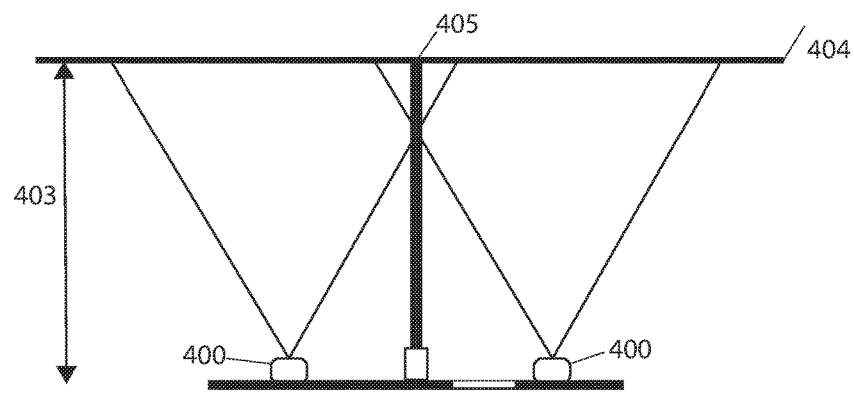
FIGS. 4A-4D illustrate an embodiment of minimum distance measurement varying with angular position of image sensors, embodying features of the present invention.
Figure 4B:
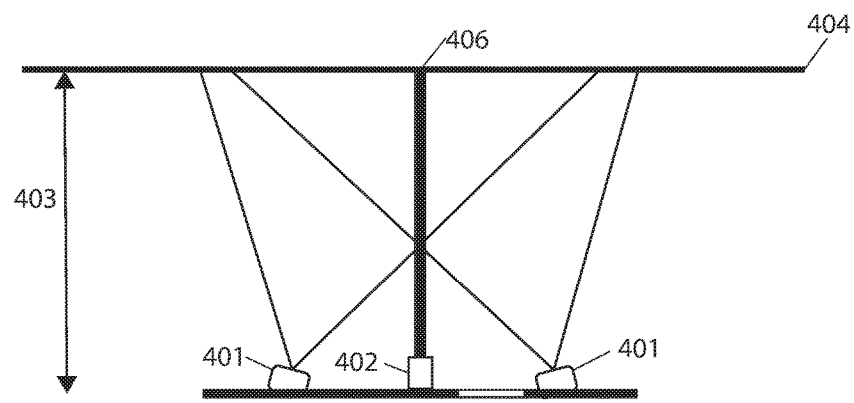
Figure 4C:
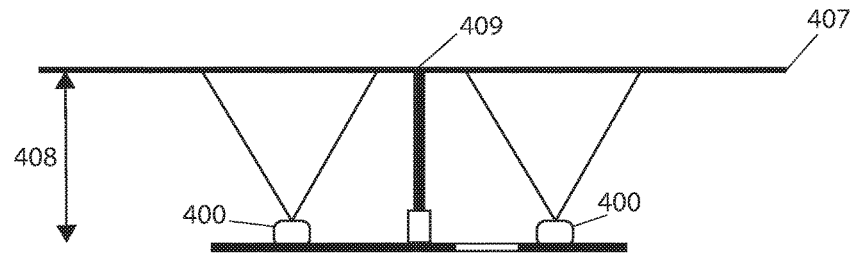
Figure 4D:
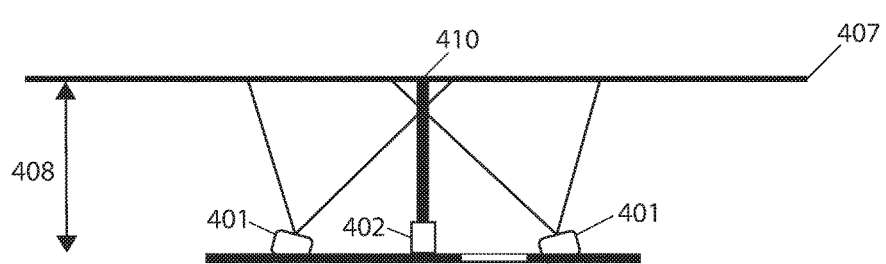

In some embodiments, the two image sensors are aimed directly forward without being angled towards or away from the laser light emitter. When image sensors are aimed directly forward without any angle, the range of distances for which the two fields of view may capture the projected laser point is reduced. In these cases, the minimum distance that may be measured is increased, reducing the range of distances that may be measured. In contrast, when image sensors are angled inwards towards the laser light emitter, the projected light point may be captured by both image sensors at smaller distances from the obstacle. FIG. 4A shows top view of image sensors 400 positioned directly forward while FIG. 4B shows image sensors 401 angled inwards towards laser light emitter 402. It can be seen in FIGS. 4A and 4B, that at a distance 403 from same object 404, projected light points 405 and 406, respectively, are captured in both configurations and as such the distance may be estimated using both configurations. However, for object 407 at a distance 408, image sensors 400 aimed directly forward in FIG. 4C do not capture projected light point 409. In FIG. 4D where image sensors 401 are angled inwards towards laser light emitter 402, projected light point 410 is captured by image sensors 401 at distance 408 from object 407. Accordingly, in embodiments, image sensors positioned directly forward have larger minimum distance that may be measured and, hence, a reduced range of distances may be measured.

In embodiments, the distance estimation system may comprise a lens positioned in front of the laser light emitter that projects a horizontal laser line at an angle with respect to the line of emission of the laser light emitter. The images taken by each image sensor may be superimposed and the distance between coinciding points along the length of the projected line in each image may be used to determine the distance from the surface using a preconfigured table as described above. The position of the projected laser line relative to the top or bottom edge of the captured image may also be used to estimate the distance to the surface upon which the laser light is projected, with lines positioned higher relative to the bottom edge indicating a closer distance to the surface. In embodiments, the position of the laser line may be compared to a preconfigured table relating the position of the laser line to distance from the surface upon which the light is projected. In some embodiments, both the distance between coinciding points in the superimposed image and the position of the line are used in combination for estimating the distance to the obstacle. In combining more than one method, the accuracy, range, and resolution may be improved.

Figure 5A:
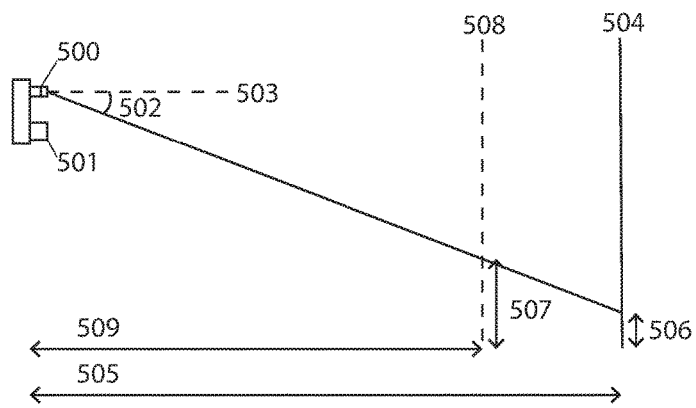
FIGS. 5A-5C illustrate an embodiment of distance estimation using a variation of a distance estimation device, embodying features of the present invention.

FIG. 5A demonstrates an embodiment of a side view of a distance estimation system comprising laser light emitter and lens 500, image sensors 501, and image processor (not shown). The lens is used to project a horizontal laser line at a downwards angle 502 with respect to line of emission of laser light emitter 503 onto object surface 504 located a distance 505 from the distance estimation system. The projected horizontal laser line appears at a height 506 from the bottom surface. As shown, the projected horizontal line appears at a height 507 on object surface 508, at a closer distance 509 to laser light emitter 500, as compared to obstacle 504 located a further distance away. Accordingly, in embodiments, in a captured image of the projected horizontal laser line, the position of the line from the bottom edge of the image would be higher for objects closer to the distance estimation system. Hence, the position of the project laser line relative to the bottom edge of a captured image may be related to the distance from the surface.

Figure 5B:
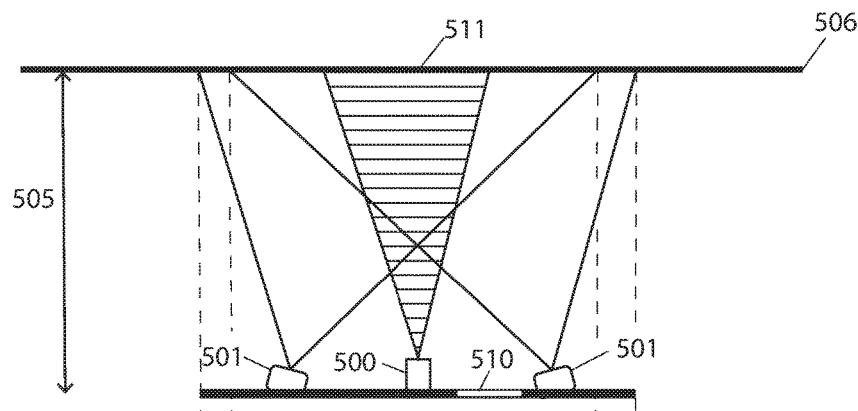
Figure 5C:
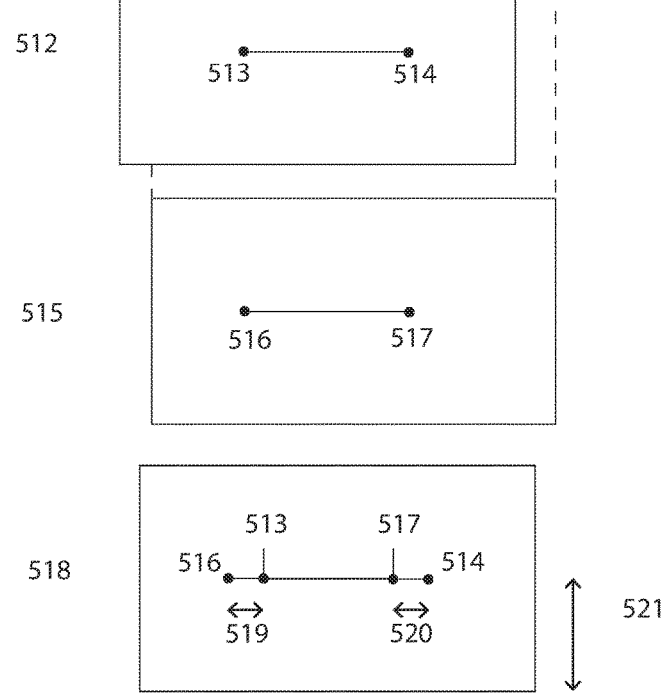

FIG. 5B illustrates an embodiment of a top view of the distance estimation system with laser light emitter and lens 500, image sensors 501, and image processor 510. Horizontal laser line 511 is projected onto object surface 506 located a distance 505 from the baseplate of the distance measuring system. FIG. 5C illustrates images of the projected laser line captured by image sensors 501. The horizontal laser line captured in image 512 by the left image sensor has endpoints 513 and 514 while the horizontal laser line captured in image 515 by the right image sensor has endpoints 516 and 517. FIG. 5C also illustrates the superimposed image 518 of images 512 and 515. On the superimposed image, distances 519 and 520 between coinciding endpoints 516 and 513 and 517 and 514, respectively, along the length of the laser line captured by each camera may be used to estimate distance from the baseplate to the object surface. In embodiments, more than two points along the length of the horizontal line may be used to estimate the distance to the surface at more points along the length of the horizontal laser line. In embodiments, the position of the horizontal line 521 from the bottom edge of the image may be simultaneously used to estimate the distance to the object surface as described above. In embodiments, combining both methods results in improved accuracy of estimated distances to the object surface upon which the laser light is projected. In some configurations, the laser emitter and lens may be positioned below the image sensors, with the horizontal laser line projected at an upwards angle with respect to the line of emission of the laser light emitter. In one embodiment, a horizontal line laser is used rather than a laser beam with added lens. Other variations in the configuration are similarly possible.

In the illustrations provided, the image sensors are positioned on either side of the light emitter; however, configurations of the distance measuring system should not be limited to what is shown in the illustrated embodiments. For example, the image sensors may both be positioned to the right or left of the laser light emitter.

Similarly, in some instances, a vertical laser line may be projected onto the surface of the object. The projected vertical line may be used to estimate distances along the length of the vertical line, up to a height determined by the length of the projected line. The distance between coinciding points along the length of the vertically projected laser line in each image, when images are superimposed, may be used to determine distance to the surface for points along the length of the line. As above, in embodiments, a preconfigured table relating horizontal distance between coinciding points and distance to the surface upon which the light is projected may be used to estimate distance to the object surface. The preconfigured table may be constructed by measuring horizontal distance between projected coinciding points along the length of the lines captured by the two image sensors when the images are superimposed at incremental distances from an object for a range of distances. With image sensors positioned at an inwards angle, towards one another, the position of the projected laser line relative to the right or left edge of the captured image may also be used to estimate the distance to the projection surface. In some embodiments, a vertical line laser may be used or a lens may be used to transform a laser beam to a vertical line laser.

In other instances, both a vertical laser line and a horizontal laser line are projected onto the surface to improve accuracy, range, and resolution of distance estimations. The vertical and horizontal laser lines may form a cross when projected onto surfaces.

In embodiments, a distance estimation system comprises two image sensors, a laser light emitter, and a plate positioned in front of the laser light emitter with two slits through which the emitted light may pass. In some instances, the two image sensors may be positioned on either side of the laser light emitter pointed directly forward or may be positioned at an inwards angle towards one another to have a smaller minimum distance to the obstacle that may be measured. The two slits through which the light may pass results in a pattern of spaced rectangles. In embodiments, the images captured by each image sensor may be superimposed and the distance between the rectangles captured in the two images may be used to estimate the distance to the surface using a preconfigured table relating distance between rectangles to distance from the surface upon which the rectangles are projected. The preconfigured table may be constructed by measuring the distance between rectangles captured in each image when superimposed at incremental distances from the surface upon which they are projected for a range of distances.

In embodiments, a distance estimation system comprises at least one line laser positioned at a downward angle relative to a horizontal plane coupled with an image sensor and processer. The line laser projects a laser line onto objects and the image sensor captures images of the objects onto which the laser line is projected. The image processor extracts the laser line and determines distance to objects based on the position of the laser line relative to the bottom or top edge of the captured image. Since the line laser is angled downwards, the position of the projected line appears higher for surfaces closer to the line laser and lower for surfaces further away. Therefore, the position of the laser line relative to the bottom or top edge of a captured image may be used to determine the distance to the object onto which the light is projected. In embodiments, the position of the laser line may be extracted by the image processor using computer vision technology, or any other type of technology known in the art and may be compared to figures in a preconfigured table that relates laser line position with distances between the image sensor and projection surfaces to find an estimated distance between the image sensor and the projection surface at the time that the image was captured. FIG. 5 demonstrates an embodiment of this concept. Similarly, the line laser may be positioned at an upward angle where the position of the laser line appears higher as the distance to the surface on which the laser line is projected increases. This laser distance measuring system may also be used for virtual confinement of a robotic device as detailed in U.S. patent application Ser. No. 15/674,310.

In embodiments, the preconfigured table may be constructed from actual measurements of laser line positioned at increments in a predetermined range of distances between the image sensor and the object surface upon which the laser line is projected.

In embodiments, noise, such as sunlight, may cause interference wherein the image processor may incorrectly identify light other than the laser as the projected laser line in the captured image. The expected width of the laser line at a particular distance may be used to eliminate sunlight noise. A preconfigured table of laser line width corresponding to a range of distances may be constructed, the width of the laser line increasing as the distance to the obstacle upon which the laser light is projected decreases. In cases where the image processor detects more than one laser line in an image, the corresponding distance of both laser lines is determined. To establish which of the two is the true laser line, the width of both laser lines is determined and compared to the expected laser line width corresponding to the distance to the obstacle determined based on position of the laser line. In embodiments, any hypothesized laser line that does not have correct corresponding laser line width, to within a threshold, is discarded, leaving only the true laser line. In embodiments, the laser line width may be determined by the width of pixels with high brightness. The width may be based on the average of multiple measurements along the length of the laser line.

In embodiments, noise, such as sunlight, which may be misconstrued as the projected laser line, may be eliminated by detecting discontinuities in the brightness of pixels corresponding to the hypothesized laser line. For example, if there are two hypothesized laser lines detected in an image, the hypothesized laser line with discontinuity in pixel brightness, where for instance pixels 1 to 10 have high brightness, pixels 11-15 have significantly lower brightness and pixels 16-25 have high brightness, is eliminated as the laser line projected is continuous and, as such, large change in pixel brightness along the length of the line are unexpected. These methods for eliminating sunlight noise may be used independently, in combination with each other, or in combination with other methods during processing.

In embodiments, ambient light may be differentiated from illumination of a laser in captured images by using an illuminator which blinks at a set speed such that a known sequence of images with and without the illumination is produced. For example, if the illuminator is set to blink at half the speed of the frame rate of a camera to which it is synched, the images captured by the camera produce a sequence of images wherein only every other image contains the illumination. This technique allows the illumination to be identified as the ambient light would be present in each captured image or would not be contained in the images in a similar sequence as to that of the illumination. In embodiments, more complex sequences may be used. For example, a sequence wherein two images contain the illumination, followed by three images without the illumination and then one image with the illumination may be used. A sequence with greater complexity reduces the likelihood of confusing ambient light with the illumination. This method of eliminating ambient light may be used independently, or in combination with other methods for eliminating sunlight noise.

In embodiments, a distance measuring system includes an image sensor, an image processor, and at least two laser emitters positioned at an angle such that they converge. The laser emitters project light points onto an object, which is captured by the image sensor. The image processor may extract geometric measurements and compare the geometric measurement to a preconfigured table that relates the geometric measurements with depth to the object onto which the light points are projected (see, U.S. Patent App. No. 62/208,791 and U.S. patent application Ser. No. 15/224,442). In cases where only two light emitters are used, they may be positioned on a planar line and for three or more laser emitters, the emitters are positioned at the vertices of a geometrical shape. For example, three emitters may be positioned at vertices of a triangle or four emitters at the vertices of a quadrilateral. This may be extended to any number of emitters. In these cases, emitters are angled such that they converge at a particular distance. For example, for two emitters, the distance between the two points may be used as the geometric measurement. For three of more emitters, the image processer measures the distance between the laser points (vertices of the polygon) in the captured image and calculates the area of the projected polygon. The distance between laser points and/or area may be used as the geometric measurement. The preconfigured table may be constructed from actual geometric measurements taken at incremental distances from the object onto which the light is projected within a specified range of distances. Regardless of the number of laser emitters used, they shall be positioned such that the emissions coincide at or before the maximum effective distance of the distance measuring system, which is determined by the strength and type of laser emitters and the specifications of the image sensor used. Since the laser light emitters are angled toward one other such that they converge at some distance, the distance between projected laser points or the polygon area with projected laser points as vertices decrease as the distance from the surface onto which the light is projected increases. As the distance from the surface onto which the light is projected increases the collimated laser beams coincide and the distance between laser points or the area of the polygon becomes null.

In embodiments, projected laser light in an image may be detected by identifying pixels with high brightness. The same methods for eliminating noise, such as sunlight, as described above may be applied when processing images in any of the depth measuring systems described herein. Furthermore, a set of predetermined parameters may be defined to ensure the projected laser lights are correctly identified. For example, parameters may include, but is not limited to, light points within a predetermined vertical range of one another, light points within a predetermined horizontal range of one another, a predetermined number of detected light points detected, and a vertex angle within a predetermine range of degrees.

Traditional spherical camera lenses are often affected by spherical aberration, an optical effect that causes light rays to focus at different points when forming an image, thereby degrading image quality. In cases where, for example, the distance is estimated based on the position of a projected laser point or line, image resolution is important. To compensate for this, in embodiments, a lens with uneven curvature may be used to focus the light rays at a single point.

Further, with traditional spherical lens camera, the frame will have variant resolution across it, the resolution being different for near and far objects. To compensate for this uneven resolution, in embodiments, a lens with aspherical curvature may be positioned in front of the camera to achieve uniform focus and even resolution for near and far objects captured in the frame.

In some embodiments, the distance estimation device further includes a band-pass filter to limit the allowable light.

In some embodiments, the baseplate and components thereof are mounted on a rotatable base so that distances may be estimated in 360 degrees of a plane.

Figure 6A:
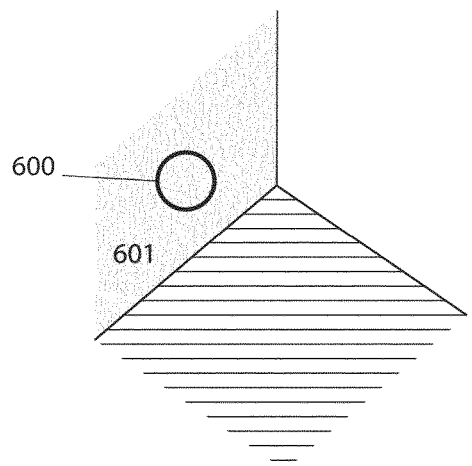
FIG. 6A-6F illustrate an embodiment of a camera detecting a corner, embodying features of the present invention.
Figure 6B:
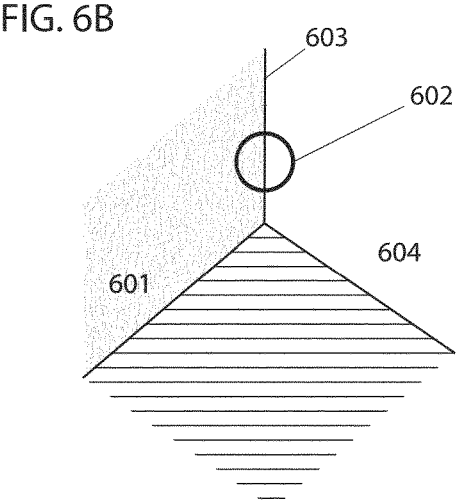
Figure 6C:
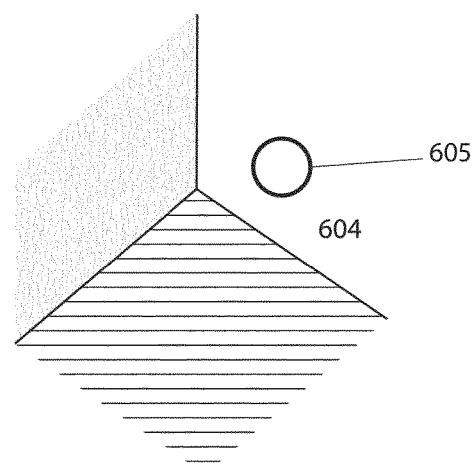
Figure 6D:
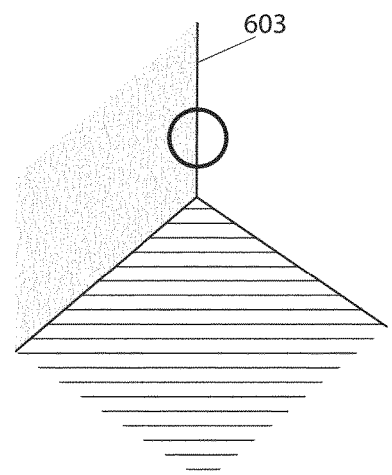
Figure 6E:
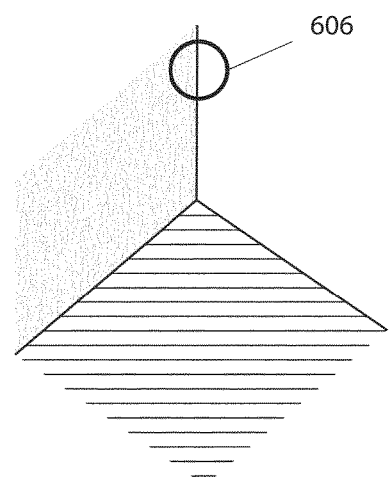
Figure 6F:
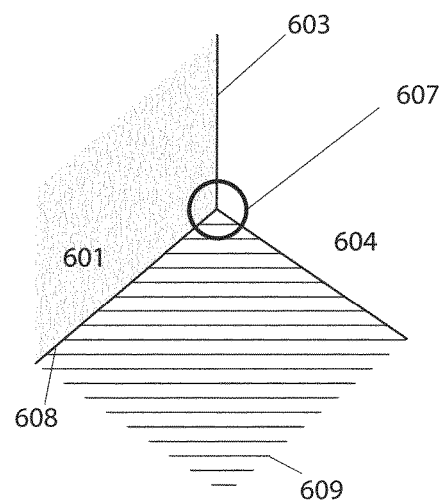

In embodiments, the camera or image sensor used may provide additional features in addition to being used in the process of estimating distance to objects. For example, pixel intensity used in inferring distance may also be used for detecting corners as changes in intensity are usually observable at corners. FIG. 6 illustrates an example of how a corner may be detected by a camera. The process begins with the camera considering area 600 on wall 601 and observing the changes in color intensity as shown in FIG. 6A. After observing insignificant changes in color intensity, the camera moves on and considers area 602 with edge 603 joining walls 601 and 604 and observes large changes in color intensity along edge 603 as illustrated in FIG. 6B. In FIG. 6C the camera moves to the right to consider another area 605 on wall 604 and observes no changes in color intensity. In FIG. 6D it returns back to edge 603 then moves upward to consider area 606 as shown in FIG. 6E and observes changes in color intensity along edge 603. Finally, in FIG. 6F the camera moves down to consider area 607 with edges 603 and 608 joining walls 601 and 604 and floor 609. Changes in color intensity are observed along edge 603 and along edge 607. Upon discovering changes in color intensity in two directions by a processor of the camera, a corner is identified. In other instances, changes in pixel intensities may be identified by a processor of a robotic device or an image processor to which the camera is coupled or other similar processing devices. These large changes in intensity may be mathematically represented by entropy where high entropy signifies large changes in pixel intensity within a particular area. Entropy may be mathematically represented by:

$$H(X) = -\sum_{i=1}^{n} P(x_i) \log P(x_i)$$

where $X=(x_1, x_2, \ldots, x_n)$ is a collection of possible pixel intensities, each pixel intensity represented by a digital number. $P(x_i)$ is the probability of a pixel having pixel intensity value $x_i$. $P(x_i)$ may be determined by counting the number of pixels within a specified area of interest with pixel intensity value $x_i$ and dividing that number by the total number of pixels within the area considered. If there are no changes or very small changes in pixel intensity in an area then $H(X)$ will be very close to a value of zero. Alternatively, the pixel values of one reading (such as those with 90 numbers) may be mapped to a continuous function and the derivative of that function considered to find areas with large changes in pixel values. With the derivative being the slope, a derivative of zero would be indicative of no change in pixel value while a derivative approaching 1 would be indicative of a large change in pixel values. In some embodiments depth from de-focus technique may be used to estimate the depths of objects captured in images.

Figure 7A:
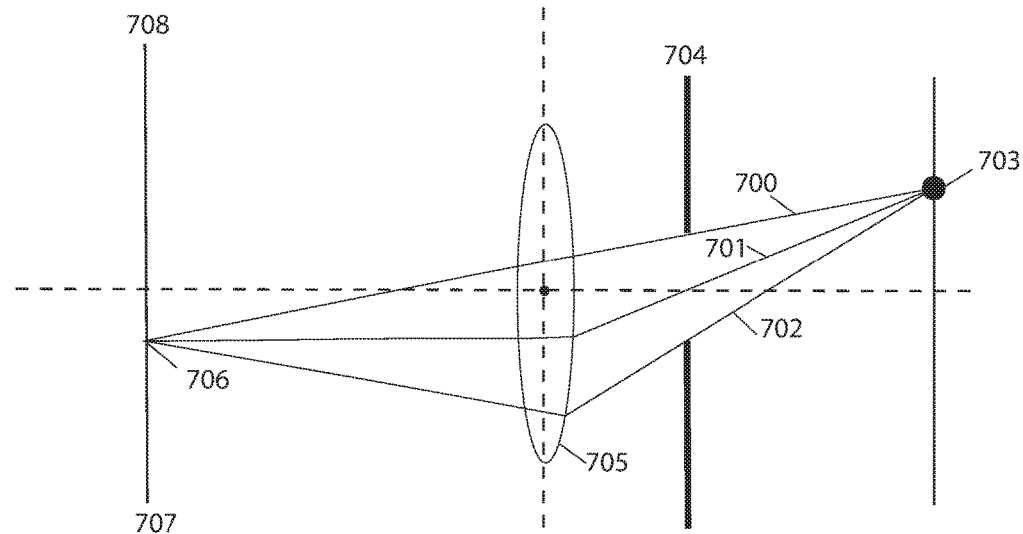
FIGS. 7A and 7B illustrate an embodiment of measured depth using de-focus technique, embodying features of the present invention.
Figure 7B:
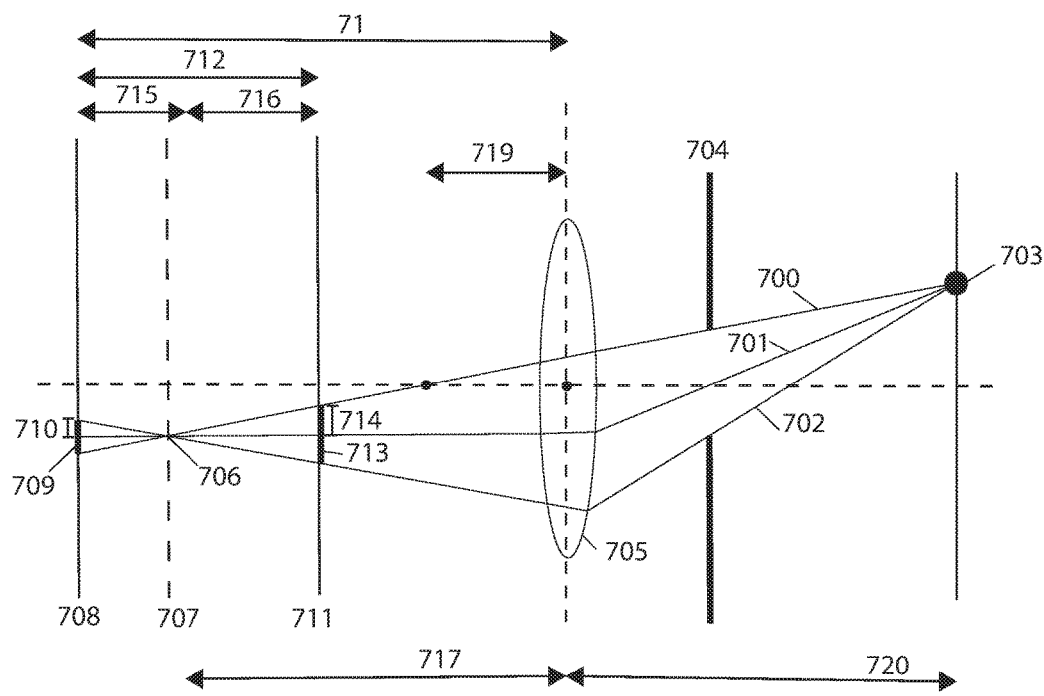

FIG. 7 illustrates an embodiment using this technique. In FIG. 7A, light rays 700, 701, and 702 are radiated by object point 703. As light rays 700, 701 and 702 pass aperture 704, they are refracted by lens 705 and converge at point 706 on image plane 707. Since image sensor plane 708 coincides with image plane 707, a clear focused image is formed on image plane 707 as each point on the object is clearly projected onto image plane 707. However, if image sensor plane 708 does not coincide with image plane 707 as is shown in FIG. 7B, the radiated energy from object point 703 is not concentrated at a single point, as is shown at point 706 in FIG. 7A, but is rather distributed over area 709 thereby creating a blur of object point 703 with radius 710 on displaced image sensor plane 708. In embodiments, two de-focused image sensors may use the generated blur to estimate depth of an object, known as depth from de-focus technique. For example, with two image sensor planes 708 and 711 separated by known physical distance 712 and with blurred areas 709 having radii 710 and 713 having radii 714, distances 715 and 716 from image sensor planes 708 and 711, respectively, to image plane 707 may be determined using the equations below:

$$R_1 = \frac{L\delta_1}{2v}$$

$$R_2 = \frac{L\delta_2}{2v}$$

$$\beta = \delta_1 + \delta_2$$

where $R_1$ and $R_2$ are blur radii 710 and 714 determined from formed images on sensor planes 708 and 711, respectively. $\delta_1$ and $\delta_2$ are distances 715 and 716 from image sensor planes 708 and 711, respectively, to image plane 707. L is the known diameter of aperture 704, v is distance 717 from lens 705 to image plane 707 and $\beta$ is known physical distance 712 separating image sensor planes 708 and 711. Since the value of $\sigma$ is the same in both radii equations ($R_1$ and $R_2$), the two equations may be rearranged and equated and using $\beta=\delta_1+\delta_2$, both $\delta_1$ and $\delta_2$ may be determined. Given $\gamma$, known distance 718 from image sensor plane 708 to lens 705, v may be determined:

$v=\gamma-\delta_1$

For a thin lens, v may be related to f, focal length 719 of lens 705 and u, distance 720 from lens 705 to object point 703:

$$\frac{1}{f} = \frac{1}{v} + \frac{1}{u}$$

Given that f and v are known, the depth of the object u may be determined.

In embodiments, all or some of the tasks of the image processor of the different variations of remote distance estimation systems described herein may be performed by the control system or processor of the robotic device or any other processor coupled to the imaging sensor.

In embodiments, two-dimensional imaging sensors may be used. In other embodiments, one-dimensional imaging sensors may be used. In embodiments, one-dimensional imaging sensors may be combined to achieve readings in more dimensions. For example, to achieve similar results as two-dimensional imaging sensors, two one-dimensional imaging sensors may be positioned perpendicularly to one another. In some instances, one-dimensional and two-dimensional imaging sensors may be used together.

Embodiments of variations of a remote distance estimation system are presented herein. Each variation may be used independently or may be combined to further improve accuracy, range, and resolution of distances to the object surface. Furthermore, methods for eliminating or reducing noise, such as sunlight noise, may be applied to each variation of a remote distance estimation system described herein.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

I claim:

1. A method for remotely estimating distance comprising:
    emitting a collimated laser beam from a laser light emitter disposed on a baseplate, the collimated laser projecting a light point on a surface opposite the laser light emitter;
    capturing images of the projected light point by each of at least two image sensors disposed on the baseplate such that the light point is contained within the images of the at least two image sensors for a predetermined range of distances;
    overlaying the images captured by the at least two image sensors by using an image processor to produce a superimposed image showing both captured images in a single image;
    measuring a first distance between the captured images of the projected light point in the superimposed image; and
    extracting a second distance from a preconfigured table that relates distances between light points with distances between the baseplate and the surface on which the collimated laser beam is projected to find an estimated distance between the baseplate and the surface on which the collimated laser beam is projected based on the first distance between the captured images.

2. The method of claim 1 wherein the preconfigured table comprises actual measurements of the first distances between the captured images of the projected light points at increments within a predetermined range of the second distances from a surface on which the collimated laser beam is projected and corresponding distances between the baseplate and the surface on which the collimated laser beam is projected.

3. The method of claim 1 wherein the baseplate and components thereof are mounted on a rotatable base, and wherein the baseplate may be rotated in any direction within a plane.

4. The method of claim 1 further comprising detecting the light point in captured images by configuring the light emitter to blink at predetermined intervals to produce a known sequence of captured images with and without the projected light point.

5. A method for remotely estimating distance comprising:
    emitting a collimated laser beam from a laser light emitter disposed on a baseplate, the collimated laser projecting a light point on a surface opposite the laser light emitter;
    capturing images of the projected light point by each of at least two image sensors disposed on the baseplate such that the light point is contained within the images of the at least two image sensors for a predetermined range of distances;
    overlaying the images captured by the at least two image sensors to produce a superimposed image showing both captured images in a single image;
    measuring a first distance between the light point in the superimposed image; and
    extracting a second distance from a preconfigured table that relates the distance between light points with distance between the baseplate and the surfaces on which the collimated laser beam is projected.

6. The method of claim 5 wherein the preconfigured table comprises distance between light points in the superimposed image at incremental distances between the baseplate and the surface on which the collimated laser beam is projected for a range of distances.

7. The method of claim 5 wherein the baseplate and components thereof are mounted on a rotatable base, and wherein the baseplate may be rotated in any direction within a plane.

8. The method of claim 5 further comprising detecting the light point in captured images by configuring the light emitter to blink at predetermined intervals to produce a known sequence of captured images with and without the projected light point.

9. A method for remotely estimating distance comprising:
    emitting a projected line from a laser light emitter disposed on a baseplate at an angle relative to a horizontal plane, the laser light emitter projecting the projected line on a surface opposite the laser light emitter;
    capturing images of the projected line by at least one image sensor disposed on the baseplate;
    identifying the projected line by a processor;
    determining a position of the projected line within the image by the processor; and,
    extracting a distance from a preconfigured table that relates the position of the projected line within the image with distance between the baseplate and the surface on which the the projected line is projected by the processor.

10. The method of claim 9 wherein the preconfigured table comprises positions of the projected line within the image at incremental distances between the baseplate and the surface on which the projected line is projected for a range of distances.

11. The method of claim 9 wherein the position of the projected line is the distance from the bottom edge of the image to the projected line.

12. The method of claim 9 wherein the position of the projected line is the distance from the top edge of the image to the projected line.

13. The method of claim 9 wherein the baseplate and components thereof are mounted on a rotatable base, and wherein the baseplate may be rotated in any direction within a plane.

14. The method of claim 9 further comprising detecting the projected line in captured images by configuring the light emitter to blink at predetermined intervals to produce a known sequence of captured images with and without the projected laser line.

15. A method for identifying a projected laser light in a captured image of the projected laser light projected onto a surface comprising:
- identifying at least one potential laser light in the captured image;
- measuring a width of the at least one potential laser light;
- extracting an expected width of the projected laser light from a preconfigured table relating the width of the projected laser light to distance from the surface onto which the projected laser light is projected for a known distance from the surface onto which the projected laser light is projected;
- comparing the width of the at least one potential laser light with the expected width of the projected laser light; and
- identifying the projected laser light when the width of the at least one potential laser light is within a predetermined threshold from to the expected width of the projected laser light.

16. The method of claim 15 wherein the preconfigured table comprises widths of the projected laser light captured in the image at incremental distances from the surface onto which the projected laser light was projected for a range of distances.

* * * * *